United States Patent [19]

Wilk

[11] Patent Number: 4,779,662
[45] Date of Patent: Oct. 25, 1988

[54] SHADE OPERATOR

[75] Inventor: John Wilk, Staten Island, N.Y.

[73] Assignee: Heli-X Shade Corporation, Brooklyn, N.Y.

[21] Appl. No.: 41,965

[22] Filed: Apr. 24, 1987

[51] Int. Cl.[4] .................................................. E06B 9/20
[52] U.S. Cl. ...................................... 160/321; 160/298
[58] Field of Search ............... 160/321, 309, 313, 315, 160/319, 322, 323 R, 294, 299, 305, 307, 291, 292, 293, 298

[56] References Cited

U.S. PATENT DOCUMENTS

| 4,223,714 | 9/1980 | Weinreich et al. | 160/319 X |
| 4,476,910 | 10/1984 | Saito | 160/291 |
| 4,498,517 | 2/1985 | Mase | 160/299 X |

FOREIGN PATENT DOCUMENTS

| 431900 | 9/1967 | Switzerland | 160/321 |
| 2070115 | 9/1981 | United Kingdom | 160/313 |

Primary Examiner—Ramon S. Britts
Assistant Examiner—David M. Purol
Attorney, Agent, or Firm—Wolder, Gross & Yavner

[57] ABSTRACT

A shade operator includes a drive unit having a central stud forming the axis of rotation for the shade roller. A manually operable pulley is mounted on the stud, and is engageable with a coil spring clutch member mounted about the stud coaxial with the pulley. The shade roller is engaged by a bushing which is also mounted for rotation on the stud. The bushing is provided with a projection which engages the clutch spring due to the weight of the shade and causes the spring to further grip the stud to prevent rotation Operation of the pulley engages the spring such that its grip on the bushing is loosened, which allows the spring, bushing and shade roller to be driven by the pulley as desired to raise or lower the shade. Halting of pulley rotation allows the spring clutch to fully re-engage the stud to keep the shade at the new desired location.

2 Claims, 3 Drawing Sheets

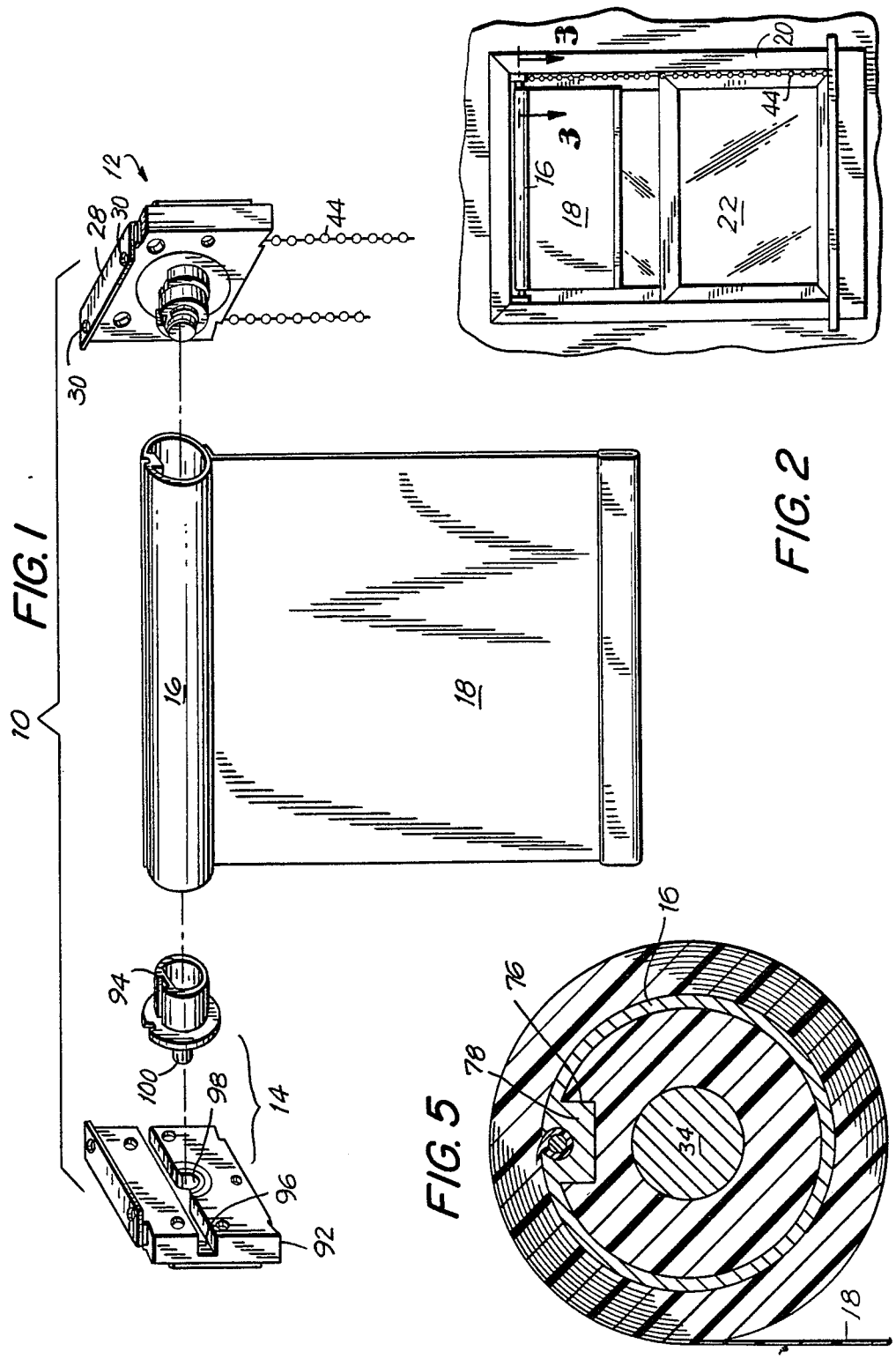

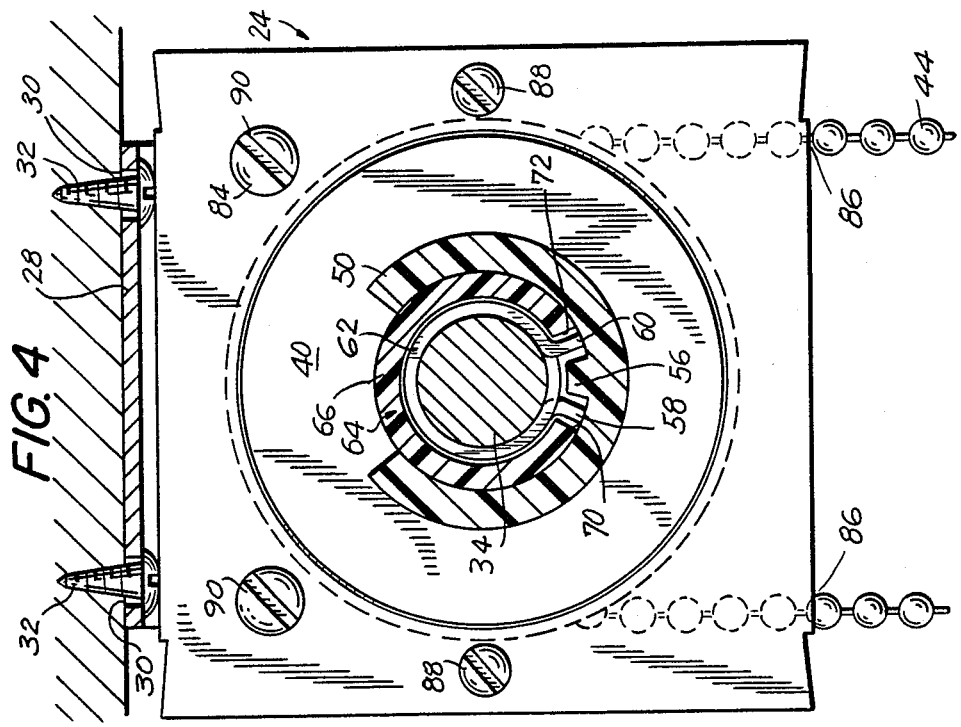
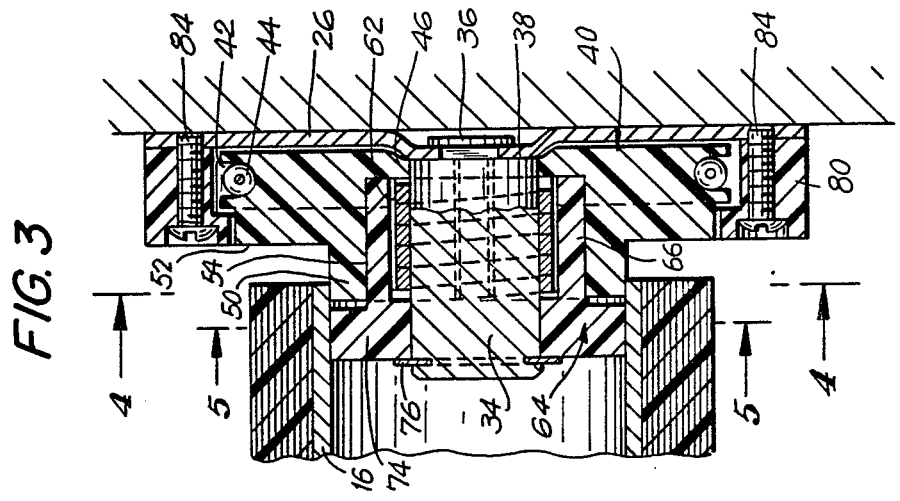

SHADE OPERATOR

BACKGROUND OF THE INVENTION

The present invention relates to an apparatus for operating and positioning a window shade. In particular, the present invention relates to a manually operated shade positioning system incorporating an integral clutch mechanism which maintains the shade roller in the desired position but which may be easily overridden by the user when the shade is desired to be repositioned.

The prior art contains a variety of shade operator systems which utilize a variety of mechanisms for maintaining a window shade at a desired position. For example, U.S. Pat. No. 4,424,852 of Jan. 10, 1984 to Hopper utilizes a bead-chain drive system in which the bead-chain is provided with a moveable retainer which counteracts the rotative force applied to the shade roller by the weight of the shade. The retainer is positionable along the length of the bead-chain as required to allow adjustment of the shade. Such an apparatus, however, requires the utilization of a bead-chain cord, and further relies upon the weight of the shade to maintain tension in the bead-chain such that the retainer is maintained in position.

BRIEF SUMMARY OF THE INVENTION

The present invention represents an advance in the art over the prior art in that it is not dependant upon the type of chain or cord utilized and does not depend upon the weight of the shade with which it is utilized.

The shade operator apparatus of the present invention employs an operator which drives the roller upon which a conventional window shade is mounted. The roller is rotatable to raise and lower the shade as desired. The operator is mounted to the roller and includes a bushing adapted to fit within the roller end and provide positive engagement therewith. A drive pulley is mounted within an appropriate housing for rotation about a central stud or axle which is mounted to the housing. A clutch means is provided on the stud between the pulley and bushing such that free rotation of the bushing, as well as the roller and shade which are connected thereto, is precluded by the clutch's frictional forces against the stud, the weight of the shade acting through the pulley, tending to increase the engagement between the clutch and stud. Manual operation of an operator cord or chain wrapped about the pulley, however, lessens clutch action and engages the bushing with the pulley, allowing the bushing and shade roller to rotate as required to raise or lower the shade. Release of manual operation reengages the clutch, maintaining the shade in the new position.

In a preferred embodiment the clutch means comprises a circular spring whose diameter is such as to provide appropriate frictional enagement with the center stud upon which it and drive pulley are mounted. The ends of the spring are formed into two arms which embrace an inwardly directed projection on the pulley such that manual rotation of the pulley causes the spring arms to separate, thereby enlarging the effective diameter of the spring, allowing the spring to slip and rotate about the stud. The normal force applied to the spring arms through the bushing by the weight of the shade biases the spring arms together, thus maintaining the frictional force between the spring body and the stud, so that the pulley, shade roller and shade are retained in position after manual operation ceases. Manual rotation overcomes the bias and allows the bushing to rotate as desired about the stud. Further objects and advantages of the present invention will become apparent from the following detailed description of a preferred, but nonetheless illustrative embodiment of the present invention when taken in connection with the annexed drawings, wherein:

FIG. 1 is an exploded perspective view of the shade operator apparatus of the present invention, installed with a conventional window shade;

FIG. 2 is a front elevation view of the shade operator and shade installed in a conventional window;

FIG. 3 is a plan sectional view of the shade operator taken along line 3—3 of FIG. 2;

FIG. 4 is a side elevation view of the shade operator taken along line 4—4 of FIG. 3;

FIG. 5 is a similar side elevation view of the shade operator taken along line 5—5 of FIG. 3, detailing the connection of the operator with the shade;

Figure 6:
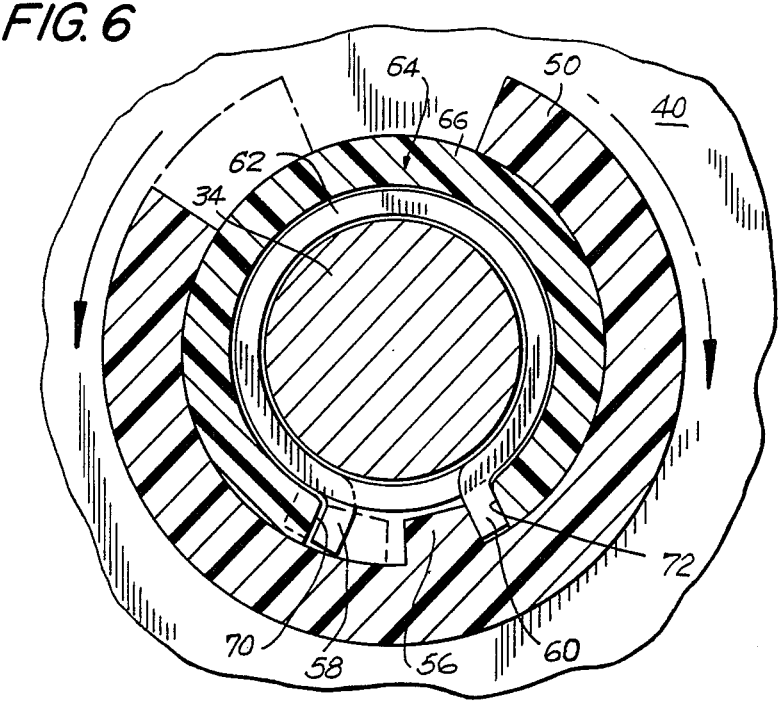
Figure 7:
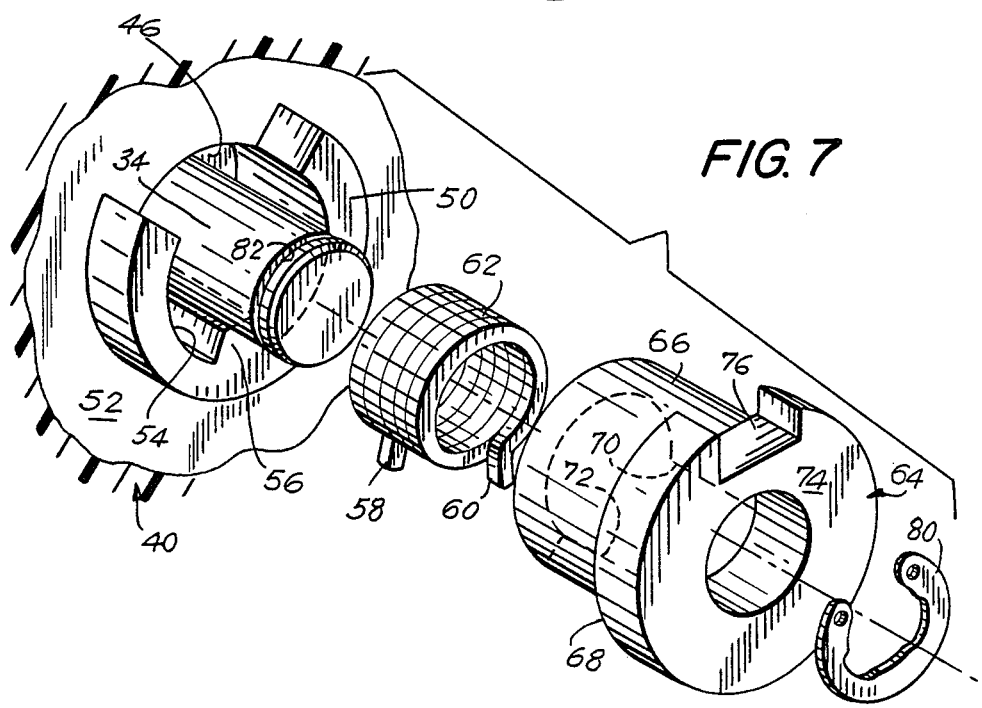

FIG. 6 is an enlarged elevation view of the clutch mechanism of the shade operator detailing the operation of the clutch; and FIG. 7 is an exploded perspective view of the shade operator. Referring initially to FIG. 1, shade operator apparatus 10 includes a drive unit 12 and a tail assembly 14 each adapted to fit into an end of shade roller 16 which supports window shade 18. Shade roller 16 and shade 18 are of conventional construction, and are dimensioned to be supported within the frame 20 of a conventional window 22 by the shade operator 10 as depicted in FIG. 2.

As seen in the Figure, drive unit 12 includes a housing 24 having a back plate 26 formed with an integral right angle portion 28 provided with bores 30 to facilitate mounting of the housing by use of screws 32 or the like to the window frame. Central axle or stud 34 is mounted to back plate 26 by swaging end 36 to the back plate. The end 36 of stud 34 may be of reduced diameter so as to form a circular shoulder 38 to abut against the back plate 26. Back plate 26 may include a recessed portion to insure that the swaged end 36 of the stud 34 does not project beyond the plane of the outer surface of the back plate. Alternative methods of mounting the stud to the back plate as well known in the art such as welding, may be alternatively employed.

Mounted for rotation about stud 34 is pulley 40, which may be formed of high impact plastic, nylon or similar composition. The pulley is provided with a track 42 about its outer periphery adapted to provide positive engagement with a ball-chain 44 which wraps about and hangs from the pulley to provide manual operation. The construction of such a ball-chain, as well as the pulley track to engage the chain, are well known in the art.

Pulley 40 is further provided with a central stud bore 48 and a coaxial central recess 46 extending partially through the pulley from pulley face 52. Arcuate shoulder 50 projects outwardly from pulley face 52, the inner surface 54 of shoulder 50 further defining recss 46 about an angle of approximately 270 degrees. Projecting inwardly from the wall of recess 46 and inner shoulder surface 54 is projection 56, adapted to coact with spring arms 58 and 60 as will be hereinafter explained.

Circular spring 62 fits upon stud 34 within central recess 46. The spring may be constructed of spring steel of square cross-section, having 0.062 inch sides, may have 4 turns, and has its ends formed into radially outwardly projecting arms 58 and 60. The arms are dimensioned so as to be contactable by projection 56 while otherwise not interfering with the rotation of pulley 40 on the stud 34. The inner diameter of spring 62 is chosen to be slightly less than the diameter of stud 34, such that when the spring is installed upon the stud the spring must be stressed by the spreading apart of arms 58 and 60 to increase the diameter of the spring to allow insertion on the stud. With a stud diameter of 0.518 inches a 0.510 inch spring diameter is appropriate.

Bushing 64 supports and drives shade roller 16 and, as best seen in FIG. 7, is formed with a cylindrical head portion 74, the surface 68 of which rests upon shoulder pulley shoulder 50 for rotation about stud 34. Depending from head portion 74 is arcute wall 66 of about 280 degrees, having an outer diameter sized to fit within central recess 46 and shoulder 54 on pully 40 and having an inner diameter sufficient to fit over stud 34 and coil spring 62. Wall 66 has radial end portions 70 and 72 spaced from and located to embrace spring arms 58 and 60. As bushing 64 is rotated relative to spring 62 end portion 70 or 72 alternatively contacts and engages the outer radially directed side of spring arm 58 or 60.

As seen in FIG. 5, peripheral notch 76 in the bushing head 74 provides a keywayfor mating shade roller tongue 78, and insures a positive grip of the shade roller 16.

Pulley 40, spring 62 and bushing 64 are all maintained on stud 34 by means of C washer 80, which fits within mating groove 82 at the distal end of the stud. As seen in FIG. 4, the entire assembly is sealed by housing cover 24, which fits around the periphery of pulley 40 such that a channel is created for ball-chain 44, as can be seen in FIG. 3. The housing cover is also provided with exitways 86 for the ball-chain. Appropriate bores are provided in both the housing cover 24 and back plate 26 to permit the fastening of the two together by appropriate means, such as screws 88.

Drive unit 12 is mounted within the window frame in a conventional manner, utilizing either screws 32 through right angle portion 28 of back plate 26 or by the use of screws 90 through provided bores in housing cover 24 and back plate 26. The tail bracket 92 of tail assembly 14 is mounted on the opposite side of the window frame 20 such that the axis of rotation of tail insert 94 matches that of drive unit 12. The construction of tail assembly 14 is not intended to comprise a part of the present invention and may be of conventional construction, and includes an insertion passageway 96 in tail bracket 92 to allow insertion of shade roller 16 and tail insert 94 into cradle portion 98 which supports pin 100 of the tail insert 94 to permit rotation of the shade roller.

With shade roller 16 and window shade 18 installed upon the shade operator, the shade is maintained in any unrolled extent by the frictional engagement of the turns of spring 62 against stud 34. The weight of the shade 18 exerts a torque on one of the outer radial surfaces of arms 58, 60 through contact with the appropriate sides of bushing slot 68. This torque tends to compress spring 62 around stud 34, thus increasing the frictional force between the spring and the stud to prevent rotation of the spring, bushing 74 and the roller/shade assembly.

As shown in FIG. 6, manual rotation of pulley 40 by use of ball-chain 44 causes pulley projection 56 to come in contact with one of the inner surfaces of spring arms 70, 72. This force against such an inner surface causes the spring 62 to flex open slightly, thus lowering the frictional forces between the spring and stud 34. The spring thus rotates about stud 34, with the contacted spring arm driving the appropriate face of bushing notch 72 and rotating bushing 70 and shade roller 16, thus raising or lowering the shade as appropriate. When the desired shade height is reached, the ceasing of motion of pulley 40 releases the manual torque against spring 62, which then relaxes to its normal configuration, again tightly gripping stud 34 and preventing additional rotation of the shade.

It is to be appreciated that the embodiment as described herein is but illustraive of the present invention, and that numerous and suitable modifications and adaptations of the invention are contemplated to be within the scope of the invention as claimed herein.

What is claimed is:

1. A window shade operator comprising a mounting plate having a circular stud projecting therefrom; a pulley in the form of a circular plate having first and second parallel sides and an operator track on its outer edge, a central bore through said circular plate for passage of said stud, and a concentric circular recess in said first side, the wall formed by said recess being extended outwardly from said first side in an arcuate manner for a substantial radial portion of said recess to form a arcuate shoulder about said recess, said wall having a radially-inwardly directed projection; a coil spring mounted on and frictionally enaging said stud within said circular recess, said spring having first and second ends projecing radially outward to embrace said inwardly directed projection; a roller support bushing comprising a circular head having a central bore for said stud and an arcuate shoulder projecting from a face thereof concentric with said bushing central bore, said bushing being mounted on said stud such that said bushing face rests upon said pulley shoulder and said bushing arcuate shoulder extends within said circular recess of said pulley between said pulley wall and said spring, the ends of said bushing arcuate shoulder embracing said spring ends; and means for retaining said pulley, spring and bushing on said stud.

2. The apparatus of claim 1 wherein said pulley is manually operable by a bead chain.

* * * * *